United States Patent [19]

Pirs et al.

[11] Patent Number: 5,434,685
[45] Date of Patent: Jul. 18, 1995

[54] FERROELECTRIC LIQUID CRYSTAL CELL, A METHOD OF MAKING IT, AND ITS USE

[75] Inventors: Janez Pirs; Robert Blinc; Slobodan Zumer; Igor Musevic; Bojan Marin; Silva Pirs, all of Ljubljana, Slovenia; Joseph W. Doane, Kent, Ohio

[73] Assignee: Kent State University, Kent, Ohio

[21] Appl. No.: 172,430

[22] Filed: Dec. 22, 1993

Related U.S. Application Data

[63] Continuation-in-part of Ser. No. 956,787, Oct. 5, 1992, abandoned.

[30] Foreign Application Priority Data

Jan. 10, 1992 [YU] Yugoslavia ................. 19/92

[51] Int. Cl.⁶ ............................................. G02F 1/13
[52] U.S. Cl. .............................. 359/51; 359/52; 359/100
[58] Field of Search .......................... 359/51, 52, 100

[56] References Cited

U.S. PATENT DOCUMENTS

| | | | |
|---|---|---|---|
| 4,367,924 | 1/1983 | Clark et al. | 359/100 |
| 4,563,059 | 1/1986 | Clark et al. | 359/100 |
| 4,673,255 | 6/1987 | West et al. | 359/51 |
| 4,925,708 | 5/1990 | Waters et al. | 428/1 |
| 5,088,807 | 2/1992 | Waters et al. | 359/51 |
| 5,155,607 | 10/1992 | Inoue et al. | 359/51 |
| 5,189,540 | 2/1993 | Nakamura et al. | 359/102 |
| 5,208,687 | 5/1993 | Yoshida et al. | 359/52 |
| 5,321,533 | 6/1994 | Kumar | 359/51 |
| 5,327,271 | 7/1994 | Takeuchi et al. | 359/51 |
| 5,381,256 | 1/1995 | Hanyu et al. | 359/100 |

FOREIGN PATENT DOCUMENTS

| | | |
|---|---|---|
| 0313053 | 4/1989 | European Pat. Off. |
| 0423881 | 4/1991 | European Pat. Off. |
| 0451905 | 10/1991 | European Pat. Off. |
| 63-109419 | 5/1988 | Japan ................. 359/51 |
| 1-145636 | 6/1989 | Japan ................. 359/100 |
| 3163521 | 7/1991 | Japan ................. 359/100 |
| 3278024 | 12/1991 | Japan ................. 359/103 |
| 9307527 | 4/1993 | WIPO ................. 359/100 |

OTHER PUBLICATIONS

Clark et al, Submicrosecond Bistable Electro-Optic Switching in Liquid Crystals—Appl. Phys Lett—vol. 36 (Jun. 6, 1980) pp. 899–901.

Johnson et al, May 1, 1988, "Optical Interconnection Networks Using Polarization Based Ferroelectric Liquid Crystal Gates", Appl. Optics—vol. 27 (May 1, 1988) pp. 1127–1133.

Bos—May 30, 1990, Applications of Smectic Liquid Crystals in Practical Liquid Crystals—Lecture Notes, May 30, 1990 pp. 4–1 through 4–31.

Hikmet, "Electrically Induced Light Scattering From Anisotropic Gels", J. Appl. Phys., vol. 68, (Nov. 1, 1990) pp. 4406–4412.

Doane et al, Aug. 1991, "Current Trends in Polymer Dispersed Liquid Crystals"—1991 Trans IEEE (Aug. 1991), pp. 175–178.

Primary Examiner—William L. Sikes
Assistant Examiner—Ron Trice
Attorney, Agent, or Firm—Watts Hoffmann Fisher & Heinke

[57] ABSTRACT

An oriented ferroelectric liquid crystal in the chiral smectic C phase with the smectic planes normal to bounding plates of a cell is interspersed with polymer which stabilizes and freezes the arrangement of the liquid crystal.

6 Claims, 1 Drawing Sheet

FERROELECTRIC LIQUID CRYSTAL CELL, A METHOD OF MAKING IT, AND ITS USE

This is a continuation-in-part of U.S. application Ser. No. 07/956,787, filed Oct. 5, 1992 now abandoned.

BACKGROUND OF THE INVENTION

1. Technical Field

This application relates generally to liquid crystal display technology, and more specifically to volume stabilized ferroelectric liquid crystal materials, and displays cells produced therewith.

2. Description of the Prior Art

Ferroelectric liquid crystal cells suitable for liquid crystal electro-optic switching devices have been shown to have numerous advantages over cells employing nematic liquid crystals due to the advantageous physical properties of ferroelectric liquid crystals. Ferroelectric liquid crystals exhibit faster switching times and an excellent memory effect due to their pronounced structural bistability. Switching of ferroelectric liquid crystals is simplified because they require only a passive thin-film electrode control matrix which, unlike the active matrices required by nematic liquid crystal cells, does not consist of transistors and diodes.

In Appl. Phys. Lett. 36, 11 (1980) and in U.S. Pat. No. 4,367,924, N. A. Clark and S. T. Lagerwall described a surface stabilized ferroelectric liquid crystal cell. The arrangement of liquid crystal molecules is accomplished by means of a surface alignment layer being provided on either bounding plate of the cell. The distance between the bounding plates is controlled by spacers, such as glass fibers, particles of a granulated material, polystyrene spherical microparticles and the like, which are distributed throughout the cell. In spite of subsequent improvements, as reported in, for example, U.S. Pat. No. 4,958,916; Ferroelectrics 59, 25 (1984); Molecular Crystals and Liquid Crystals 114, 151 (1984) and Phys. Rev. A 37,3 1053 (1988), ferroelectric liquid crystal cells are particularly sensitive to mechanical disturbances. Moreover, since it is difficult to stabilize the distance between the bounding plates, currents of the liquid crystal arise within the cell and destroy the original arrangement of the ferroelectric liquid crystal. Similarly, if the cell is subjected to a substantial temperature increase the arrangement of the liquid crystal is destroyed and, by themselves, the surface alignment layers may be ineffective to restor the original arrangement unless special thermal procedures are used.

The use of composite materials, such as a liquid crystal within a polymer, is also known as seen, for example, in *Liquid Crystals*, Vol. 4, pp 327–336 (1986), and U.S. Pat. Nos. 4,688,900, 4,685,711 and 4,994,204. However, substantial amounts of a polymer are required for these cells to obtain microdroplets of liquid crystal within the polymer. The liquid crystal molecules in the microdroplets are oriented radially or bipolarly. By an electric field between the bounding plates of the cell, light scattering in the composite material is controlled.

DISCLOSURE OF THE INVENTION

It has now been discovered that a ferroelectric liquid crystal cell can be prepared in which an incorporated polymer will help stabilize the arrangement of molecules of the ferroelectric liquid crystal in the cell, a phenomenon referred to herein as volume stabilization. The cell of the invention advantageously retains the superior properties of known ferroelectric liquid crystal cells while reducing their susceptibility to mechanical shock. Moreover, the incorporated polymer also stabilizes the mutual distance of the cell walls and prevents the flow of liquid crystal within the cell.

Volume stabilization of the molecular ordering of the ferroelectric liquid crystal (FELC) is based on the polymerization of a small amount of monomer added to the FELC. The amount of monomer added is small enough so that it does not significantly affect the molecular ordering or alignment of the ferroelectric liquid crystal material. The polymerization of the monomer is initiated when the molecules of liquid crystal acquire the desired orientation, which may be brought about by the treatment of the cell surface and/or interactions with orienting magnetic and electric fields. Under these conditions the monomer polymerizes in an anisotropic texture. The polymer forms a network of various structural morphologies, such as of thread like structures, droplets and globules throughout the entire liquid crystal which serve the two-fold function of volume stabilizing the ferroelectric molecular ordering of the liquid crystal molecules as well as the overall liquid crystal cell geometry.

Advantageously the polymer permeates the liquid crystal, typically in the form of thread like structures, droplets and globules, thereby presenting surfaces that are believed to help to stabilize the molecular orientation of the ferroelectric liquid crystal. Thus, the arrangement or structure of the liquid crystal is maintained, i.e. volume stabilized, because the polymer locks in the molecular ordering of the ferroelectric liquid crystals and hinders the flow of liquid crystal through the cell. The cells of the present invention retain all of the heretofore known advantages of ferroelectric liquid crystal cells. In a preferred embodiment the cell includes large polymer microdroplets or globules randomly distributed throughout the cell which adhere to both bounding plates of the cell. These larger microdroplets or globules function to fix the mutual distance of the cell walls and also prevent the flow of the liquid crystal through the cell. Consequently, the arrangement of the ferroelectric liquid crystal is much more resistant to mechanical disturbances.

In preferred cells the ferroelectric liquid crystal is aligned by the combined orienting effect of rubbed orienting or alignment layers, such as rubbed nylon, and a strong magnetic field parallel to the liquid crystal layer. The magnetic field is present during the slow controlled cooling process from the isotropic phase, through the nematic and smectic A (SmA) phases into the ferroelectric smectic C (SmC*) structure. The preferred orientation is established after phase transition from the chiral nematic to the SmA phase with a stable layered structure that extends through the phase transition to the ferroelectric SmC* phase. During the phase transition from the chiral nematic to the smectic A phase, the molecules are displaced within planes parallel to the cell walls to form smectic layers as is known in the art, having smectic planes perpendicular to the cell walls. When the ordering effect of the magnetic field is combined with the additional use of a strong, slowly alternating electric field in the SmC* phase a homogeneous fine stripe texture results, with a bookshelf type molecular ordering where the smectic planes in each stripe are tilted.

The various polymer structures present in the inventive cells, e.g., the texture threads, droplets and globules, occur randomly throughout the cell and result from a reduction of the solubility of the monomer upon the cooling of the liquid crystal/monomer mixture, the structural changes occurring during the phase transitions, and the phase separation of the monomer upon polymerization. The combination of these various polymer structures in return serve to stabilize the molecular ordering of the liquid crystal molecules and the overall cell geometry. It should be noted that the terms such as "threads", "droplets" and "globules" are used herein in an effort to characterize and describe the occurrence of phase separated polymer in generally different morphologies throughout the cell and are not intended to be limiting in any sense. It has been observed that there are three principle polymer morphologies or textures occurring in the cells which can generally be characterized as thread like, droplet like and globular. However, the polymer in the cell occurs randomly as a three dimensional network of polymer comprising these textures and accordingly, may exhibit random textures or combinations of such textures that might be characterized by other terms.

When the liquid crystal/monomer mixture begins to cool the solubility of the monomer in the liquid crystal decreases and the monomer begins to phase separate first in the form of microdroplets. The reduction of solubility of the monomer is also believed to be in part, due to the phase transitions of the liquid crystal upon cooling. Most of these microdroplets form predominantly on the cell walls and are small. If larger amounts of monomer are used some of the droplets may grow rather large and even extend from one cell wall to the other. Upon polymerization the remaining monomer which was still "dissolved" in the liquid crystal phase separates therefrom to form different polymer textures. When the microdroplets are large enough to form globules reaching from one cell wall to the other prior to polymerization, such large connecting globules or droplets act to space the cell and adhere it together as well as to stabilize the geometry of the cell. Without being bound by theory, it is also believed that the U.V. polymerization acts to polymerize the separated droplets and globules, as well as to polymerize and induce the phase separation of the remaining monomer that is still dissolved in the liquid crystal. The monomer that phase separates upon polymerization forms a well ordered polymer network or structure that approximates the molecular ordering of the liquid crystal. Since the monomer that assumes or approximates the ferroelectric molecular ordering of the liquid crystal and retains this ordered polymer texture upon polymerization, it in turn volume stabilizes or locks in the liquid crystal molecular ordering. Whatever the mechanism, this structure is preserved even if the liquid crystal is subsequently heated above the isotropic phase transition and again cooled to the ferroelectric SmC* phase.

The best results are obtained when the polymerization is induced with the liquid crystal in the ferroelectric SmC* phase. The ordered polymer texture may also be formed in the SmA and in the nematic phase as well.

In accordance with the foregoing, one embodiment of the invention provides a ferroelectric liquid crystal cell comprising cell wall structure provided with means for electrically addressing the liquid crystal, ferroelectric liquid crystal is disposed between the cell walls and polymer interspersed with the liquid crystal. The cell walls are separated by a distance smaller than the helix period of the ferroelectric liquid crystal and the liquid crystal exhibits a chiral smectic C phase with smectic planes substantially normal to the cell walls. The polymer is interspersed with the liquid crystal in a random three dimensional structure that substantially stabilizes the molecular orientation of said ferroelectric liquid crystal.

In a preferred embodiment the polymer structure comprises thread like structures running predominantly parallel to said cell walls and microdroplets wherein the thread like structures are randomly adhered to each other and to the microdroplets. In this embodiment the microdroplets are disposed predominantly on the cell walls. However, in yet another preferred embodiment a proportion of the polymer microdroplets occur in the form of globules which extend from one cell wall to the other cell wall and adhere thereto.

In addition to the SmC* phase, the ferroelectric liquid crystal preferably also exhibits an isotropic phase, chiral nematic phase and a smectic A phase and the polymer is present in an amount of about 1% to about 6% by weight based on the combined weight of the liquid crystal and polymer.

The invention also provides a method of making ferroelectric liquid crystal cell. The method includes the steps of introducing a mixture of a monomer and ferroelectric liquid crystal between cell walls when said mixture is in the isotropic phase, cooling said mixture until the ferroelectric liquid crystal exhibits a chiral nematic or smectic phase, and polymerizing the mixture of the monomer and liquid crystal. In one embodiment the polymerization of the monomer is initiated in chiral nematic phase. Preferably, the polymerization of the monomer is initiated in any of the smectic liquid crystal phases. In another embodiment the liquid crystal and polymer mixture is cooled in the presence of a magnetic field that is parallel to said cell walls. In addition, the mixture may be cooled in the presence of an electric field that is perpendicular to the cell walls.

Other objects, advantages and features of the invention will be apparent from the following detailed description of the preferred embodiment thereof, when read in conjunction with the accompanying drawings.

DETAILED DESCRIPTION OF THE PREFERRED EMBODIMENT

Figure 1:
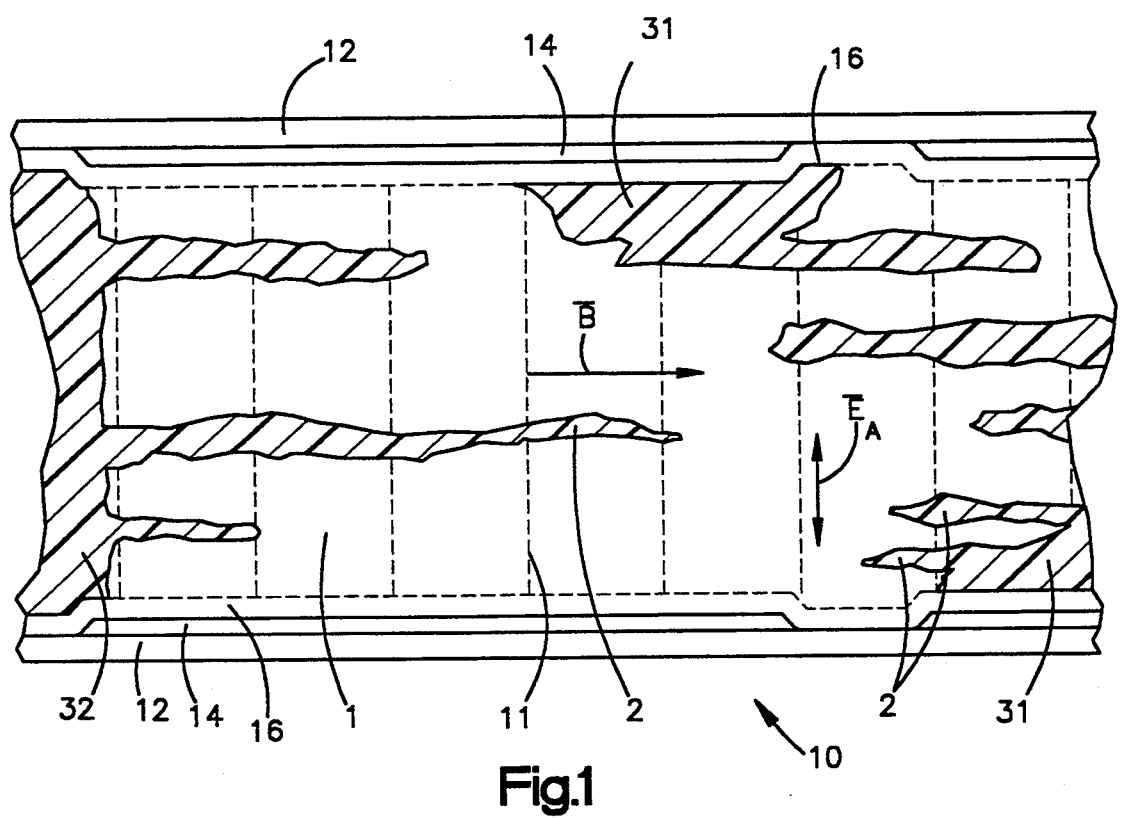
FIG. 1 is a conceptual diagrammatic cross section of a cell according to the invention.

FIG. 1 shows a ferroelectric liquid crystal cell 10 according to the invention. The cell 10 is comprised of bounding plates or cell walls 12. The bounding plates 12 are provided with transparent electrodes 14 and separated by spacers, such as glass fibers or beads (not shown) a distance smaller than the helix period of the ferroelectric liquid crystal contained therebetween. Preferably, the spacers are from about 1.5 $\mu$m to 7 $\mu$m thick. As shown the cell walls 12 are coated by an orientation layer 16 which facilitates the orientation of the ferroelectric liquid crystal 1.

As shown, the liquid crystal 1 and a polymer are disposed between the cell walls 12. The microdroplets designated by reference character 31 occur entirely on one or the other of the cell walls 12 only and are adhered thereto. The polymer structures in the cell occur in various structural morphologies, shown conceptually as thread like structures 2, and microdroplets or globules 31 and 32. The large microdroplets, i.e., globules, designated by reference character 32 extend from one cell wall to the other and adhere to both to stabilize the mutual distance of the bounding plates. The thread like textures 2 typically run parallel to the cell walls and randomly contact the microdroplets or globules 31 and 32 or originate therefrom. The microdroplets 31 and 32 are randomly distributed over the cell.

Suitable monomers would be known to those of ordinary skill in the art in view of this disclosure and include, for example, acrylates and the like. In the absence of the liquid crystal the polymer is isotropic, although this is not a requirement. The total mass of the polymer in the cell of the invention is about 1% to 6% of the mass of the liquid crystal 1 in the cell.

The described ferroelectric liquid crystal cell is made by the following method according to the invention. The cell is vacuum filled as is known in the art with a mixture of the ferroelectric liquid crystal and about 1% to 6% by weight of the monomer. The mixture of both components was prepared, and the cell filled when the ferroelectric liquid crystal is in the isotropic phase. However, the polymerization is initiated, e.g. by the ultraviolet light, only when the ferroelectric liquid crystal has cooled off at least to the chiral nematic phase and preferably to any of the smectic phases, and still more preferably to the ferroelectric phase.

The smectic planes 11 of the liquid crystal 1 are normal to the bounding plates 12. The orientation of the molecules of the liquid crystal 1 and of its smectic planes 11 is homogeneous through the cell. In one embodiment the desired orientation of liquid crystal molecules and accordingly the smectic planes 11 of the ferroelectric liquid crystal 1 in the cell may be obtained without respect to whether the orientational layers 16 are present. The influence of the alignment of the orientational layers on the liquid crystal may be significantly reduced at higher concentrations of monomer and increasing cell thickness. This means that, at the phase transition to the chiral smectic C phase, orientational defects of smectic planes 11 are likely to occur. Accordingly, in this embodiment the mixture of the liquid crystal and monomer is cooled in the magnetic field B parallel to the planes of the bounding plates 12 and the preferred orientation of the orienting layers with the flux density of at least 2 T. To obtain the macroscopic uniformity of the liquid crystal arrangement the liquid crystal in the chiral smectic C phase is exposed to approximately 100 ms pulses of an alternating electric field $E_A$ which is perpendicular to the bounding plates 12 and of the strength of about 10 MV/m and of the frequency about 3 Hz for several minutes. This tends to improve the transparency and the contrast of the cell.

When the mixture of the liquid crystal and of the monomer is cooled the monomer starts to separate first in the form of small microdroplets 31 on the bounding plates 12 of the cell. This separation takes place due to lower solubility of the monomer in the liquid crystal at the lower temperature as well as the structural transformations of the liquid crystal at the phase transitions. When the polymerization is initiated most of the monomer remaining in solution with the liquid crystal is phase separated from the liquid crystal. At lower concentrations of monomer, and when the polymerization is initiated in the chiral nematic phase the remaining monomer polymerizes and phase separates in the form of the thread like structures 2 which permeate the entire liquid crystal 1 and randomly adhere to each other or to the microdroplets 31. At higher monomer concentrations, particularly when the polymerization is initiated in the smectic A phase or in the chiral smectic C phase, the phase separated polymer tends to form the larger microdroplets or globules 32, which reach from one bounding plate 12 to the other and randomly interconnect with other polymer structures 2, 31 and 32. This is because by cooling to the SmA or SmC* phases, higher amounts of monomer have already phase separated from the liquid crystal to form the noted structures prior to polymerization. After polymerization the polymer functions to lock in the molecular ordering of the liquid crystal as well as the overall cell geometry. Moreover, the polymer structures 32 join both bounding plates 12 to stabilize the mutual distance between the bounding plates 12.

During the polymerization the monomer molecules that remained in solution or dissolved in the liquid crystal are in an ordered environment of the oriented ferroelectric liquid crystal. In other words, the monomer orients and assumes the basic molecular ordering and structure of the liquid crystal. Therefore the polymer texture with the threads 2 permeating the entire liquid crystal 1 is anisotropic and is oriented mainly parallel to the bounding plates 12. The texture threads 2 provide new surfaces which help to freeze in the arrangement of the ferroelectric liquid crystal molecules. Such arrangement is also preserved after warming the cell across the phase transition into the isotropic phase.

To facilitate the arrangement of the ferroelectric liquid crystal it should have a positive anisotropy of the diamagnetic susceptibility. For reasons of switching the cell of the invention, however, it is convention that it has a negative anisotropy of the dielectric susceptibility. However, since the orientation of liquid crystal 1 can be performed by the magnetic field B and by the alternating electric field E, suitable cells can be prepared if the anisotropy of the diamagnetic susceptibility is negative and the anisotropy of the dielectric susceptibility is positive. The anisotropy of the dielectric susceptibility, irrespective of its sign, does not substantially influence the switching of the cell since the dipole is responsible for the switching and the anisotropy influence is lower than the coupling of the electric field to the electric polarization of the liquid crystal.

Accordingly, the described method consists in orienting the ferroelectric liquid crystal and in stabilizing the uniform orientation of its molecules and of its smectic planes, this orientation being frozen in by initiating the polymerization of the monomer after the desired orientation of the molecules has been achieved.

EXAMPLE 1

In this example the multicomponent mixture of liquid crystals ZLI 4237-100 (producer E. Merck) and the monomer D044 (producer DSM Resins International) were used. The liquid crystal is in the ferroelectric phase in the broad temperature interval from 20° C. to 61° C. At higher temperatures the liquid crystal exhibits a smectic phase A, a chiral nematic and an isotropic phase. The liquid crystal has a positive anisotropy of the diamagnetic susceptibility and a negative anisotropy of the dielectric susceptibility.

At the temperature of about 100° C., the mixture of liquid crystals being in the isotropic phase, the monomer in amount 1% to 6% by weight was added. In the magnetic field of the flux density $B \geq 2$ T the mixture of the liquid crystal and of the monomer was cooled under control passing through various liquid crystal phases.

At the transition from the chiral nematic phase to the smectic A phase under the influence of the magnetic field B the ordered smectic planar structure of the liquid crystal was established. At this moment the polymerization was initiated by the ultraviolet light. In a practical version of the method the exposure to the ultraviolet light can be accomplished in the absence of the magnetic field at room temperature since the smectic structure is preserved down to the ferroelectric phase. The proportions of the polymer in the various polymer structures will vary depending on the phase in which the polymerization of the monomer is initiated and on the concentration of monomer. The bigger microdroplets 32 tend to appear at the monomer concentrations above about 3%.

To obtain macroscopic uniformity of the liquid crystal arrangement the liquid crystal in the chiral smectic phase C can be exposed to strong electric pulses for several minutes. An alternating electric field normal to the bounding plates of the cell with an electric field strength 15 MV/m, a low frequency of, for example about 3 Hz, and in long pulses lasting approximately 100 ms results in the well known stripe texture with a book shelf type molecular ordering where the smectic planes in each stripe are tilted by an angle with respect to the next plane. The chevron defect wall or lines of disclination between the consecutive stripes act as polymerization centers. The oriented polymer network thus includes thread like structures running predominantly parallel to the cell walls along the chevron defect walls, effectively stabilizing the overall striped cell geometry. The combined orienting effect of the orientation layer and the electric pulses normal to the cell walls results in a small angle between consecutive layer stripes of only a few degrees. Thus, the optical difference between the stripes, which is normally very distinct, is hardly perceptible to the eye. Due to the small angle between the smectic plane stripes, a high optical contrast between the two bistable ferroelectric molecular orientation states is achieved. This polymer stabilized stripe texture results in a highly stable structure exhibiting excellent bistability and high optical contrast.

The ferroelectric liquid crystal cell according to the invention meets the requirements for use in a high definition television display with an internal memory or for use in a very fast optic switching device. The electric control field in the display cell is parallel to the smectic planes of the ferroelectric crystal within the cell since the smectic planes are normal to the bounding plates. The switching time is one order of magnitude shorter than in the cells which are made of the nematic composites. The control of the cell of the invention is simplified because of the orientational bistability of the molecules of the ferroelectric liquid crystal in the cell whereby the memory effect is made possible. The cell according to the invention is distinguished by the high transparency, clear contrast and mechanical stability.

What is claimed is:

1. A ferroelectric liquid crystal cell comprising cell wall structure provided with means for electrically addressing said liquid crystal, ferroelectric liquid crystal disposed between said cell walls and polymer interspersed with said ferroelectric liquid crystal, wherein said cell walls are separated by a distance smaller than the helix period of said ferroelectric liquid crystal, said ferroelectric liquid crystal exhibits a chiral smectic C phase with smectic planes substantially normal to the cell walls, and said polymer is interspersed with said ferroelectric liquid crystal in a three dimensional structure that substantially stabilizes the molecular orientation of said ferroelectric liquid crystal, said polymer structure comprising microdroplets disposed predominantly on said cell walls.

2. A cell according to claim 1, wherein said ferroelectric liquid crystal further exhibits an isotropic phase, a chiral nematic phase and a smectic A phase.

3. A cell according to claim 1, wherein a proportion of said polymer occurs in the form of globules which extend from one cell wall to the other cell wall and adhere thereto.

4. A cell according to claim 1, wherein said cell walls include means for orienting the liquid crystal.

5. A ferroelectric liquid crystal cell comprising cell wall structure provided with means for electrically addressing said liquid crystal, ferroelectric liquid crystal disposed between said cell walls and polymer interspersed with said ferroelectric liquid crystal, wherein said cell walls are separated by a distance smaller than the helix period of said ferroelectric liquid crystal, said ferroelectric liquid crystal exhibits a chiral smectic C phase with smectic planes substantially normal to the cell walls, and said polymer is interspersed with said ferroelectric liquid crystal in a three dimensional structure that substantially stabilizes the molecular orientation of said ferroelectric liquid crystal, wherein said polymer structure further comprises thread like structures running predominantly parallel to said cell walls and microdroplets, said thread like structures being adhered to each other and to said microdroplets, and said microdroplets being disposed predominantly on said cell walls.

6. A ferroelectric liquid crystal cell comprising cell wall structure provided with means for electrically addressing said liquid crystal, ferroelectric liquid crystal disposed between said cell walls and polymer interspersed with said ferroelectric liquid crystal, wherein said cell walls are separated by a distance smaller than the helix period of said ferroelectric liquid crystal, said ferroelectric liquid crystal exhibits a chiral smectic C phase with smectic planes substantially normal to the cell walls, and said polymer is interspersed with said ferroelectric liquid crystal in a three dimensional structure that substantially stabilizes the molecular orientation of said ferroelectric liquid crystal, wherein said polymer is present in an amount of about 1% to about 6% by weight based on the combined weight of the liquid crystal and polymer.

* * * * *